United States Patent [19]

Bower

[11] Patent Number: 4,582,555

[45] Date of Patent: Apr. 15, 1986

[54] HEATSEAL DIE

[75] Inventor: William B. Bower, Palo Alto, Calif.

[73] Assignee: Crown Zellerbach Corporation, San Francisco, Calif.

[21] Appl. No.: 682,405

[22] Filed: Dec. 17, 1984

[51] Int. Cl.[4] ............... B30B 15/34; B32B 31/18; B32B 31/20
[52] U.S. Cl. ................... 156/290; 53/373; 156/250; 156/251; 156/510; 156/515; 156/553; 156/581; 156/583.1; 493/193; 493/194; 493/203; 493/209
[58] Field of Search ............ 156/250, 251, 290, 380.8, 156/510, 515, 553, 581, 583.1; 493/189, 194, 203, 193, 206, 209; 53/548, 550, 553, 373

[56] References Cited

U.S. PATENT DOCUMENTS

| | | | |
|---|---|---|---|
| 2,496,609 | 2/1950 | Van Antwerpen | 53/373 |
| 2,532,784 | 12/1950 | Reitzes | 493/209 |
| 3,306,001 | 2/1967 | Peppler | 53/451 |
| 4,001,075 | 1/1977 | Menzner et al. | 156/581 |
| 4,254,601 | 3/1981 | Prager et al. | 53/373 |
| 4,534,818 | 8/1985 | Kreager et al. | 156/515 |

Primary Examiner—Michael Wityshyn
Attorney, Agent, or Firm—Stanley M. Teigland

[57] ABSTRACT

This invention is an improved heatseal die that forms superior airtight seals. The die has opposed die faces, with one die face having longitudinal lands and the other die face having grooves for receiving the lands. The lands are truncated and the depth of the grooves is greater than the height of the lands. As a result, the force applied by the lands and grooves is applied entirely as a shearing force, which forms the superior heatseals.

9 Claims, 5 Drawing Figures

HEATSEAL DIE

BACKGROUND AND SUMMARY OF THE INVENTION

This invention is an improvement in heatseal dies used to form a heatseal between two heatsealable surfaces. Such dies are employed in packaging machines to form the top and bottom seals of packages made from thermoplastic film. The typical seal seen on such packages has vertical serrations. The vertical serrations provide a strong seal, but not a good airtight seal. Packages which are not airtight are called leakers. U.S. Pat No. 4,001,075 describes an improved heatseal die for avoiding leakers. The die has longitudinal (horizontal), truncated lands that substantially conform to corresponding grooves. The depth of each groove is substantially equal to the height of the corresponding land. As a result, the top of each land contacts the bottom of the corresponding groove. In the die of this invention the height of the land is less than the depth of the groove. As a result, the top of the land does not contact the bottom of the groove, and therefore more shear is imparted to the heatsealable surfaces, which produces a better airtight heatseal.

DETAILED DESCRIPTION

Figure 1:
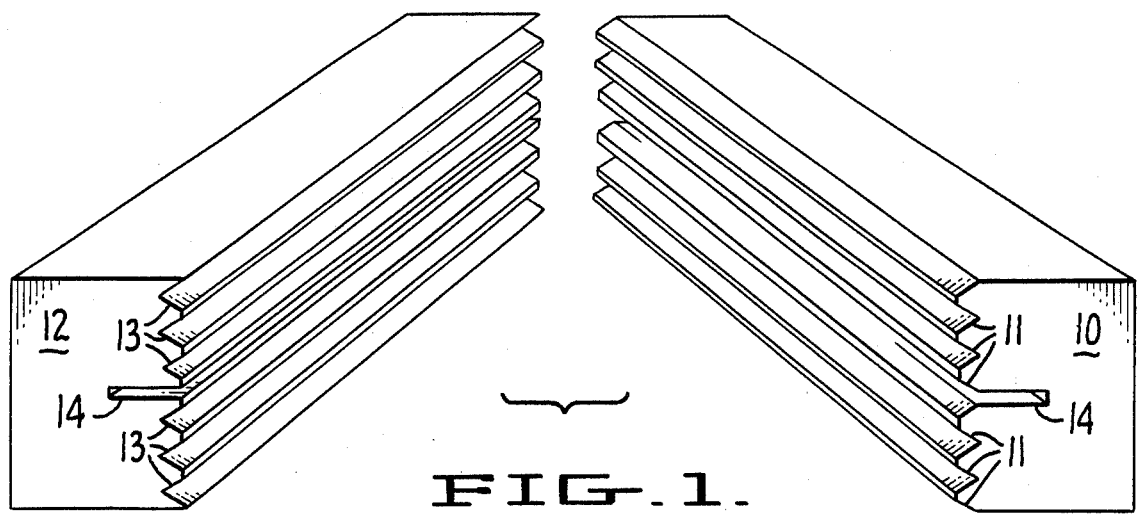
FIG. 1 is an isometric view of an embodiment of the heatseal die of this invention.

The heatseal die of this invention comprises a first bar 10 having a die face with lands 11 on it. The lands 11 are parallel to the longitudinal axis of the bar 10. The die comprises a second bar 12 having a die face with grooves 13 for receiving the lands 11. The lands and grooves have conforming sloping side walls. Each die bar has a slot 14 for receiving a knife (not shown) that severs the heatsealed material.

Figure 2:
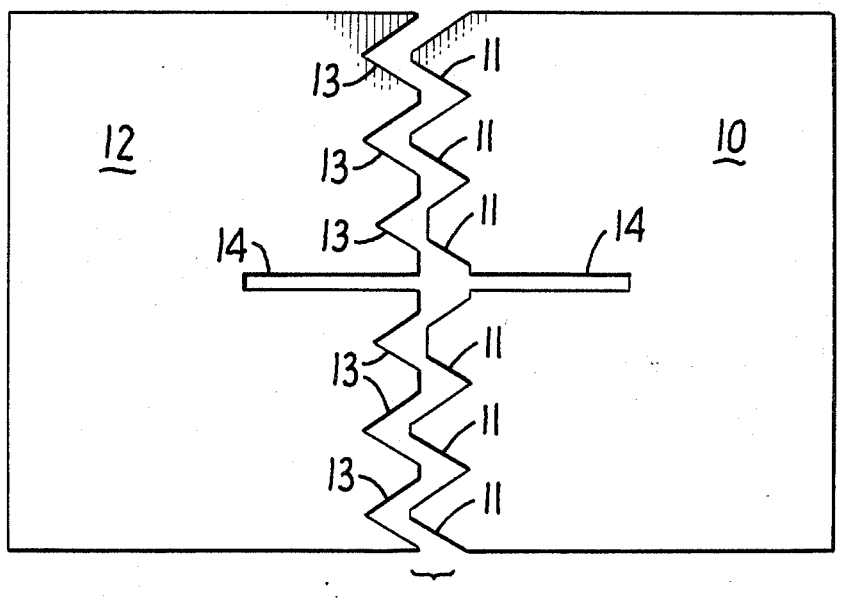
FIG. 2 is a side view of the die shown in FIG. 1, with the two die faces brought together in opposed, parallel alignment.
Figure 3:
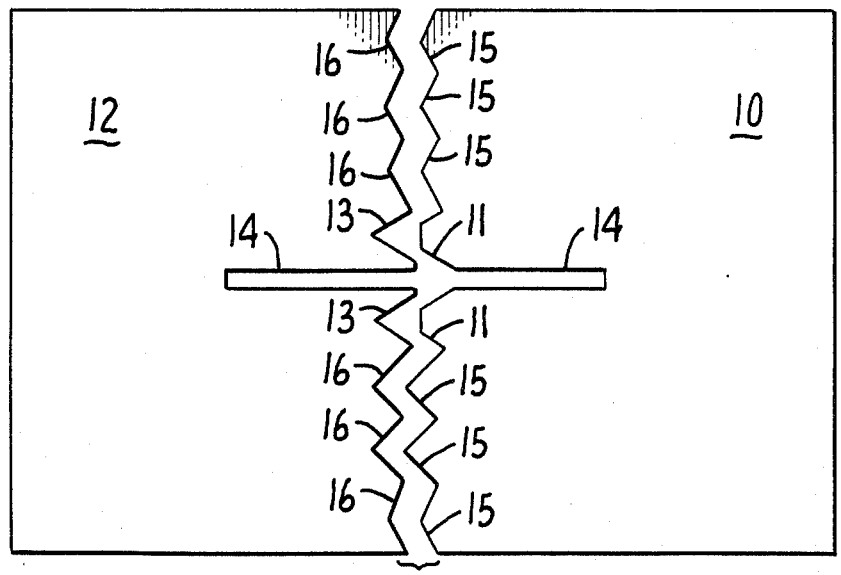
FIG. 3 is a side view of another embodiment of the die of this invention.
Figure 4:
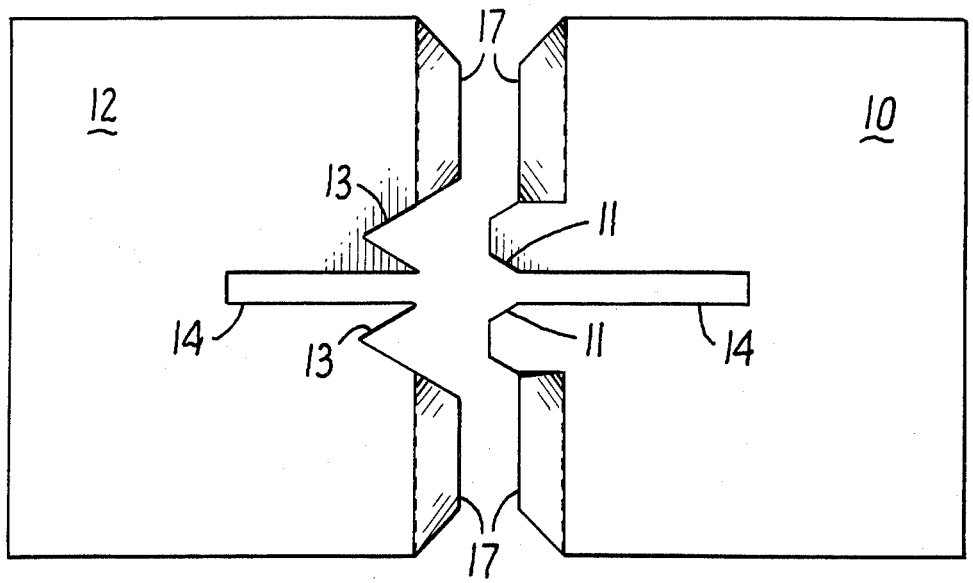
FIG. 4 is a side view of still another embodiment of the die of this invention.
Figure 5:
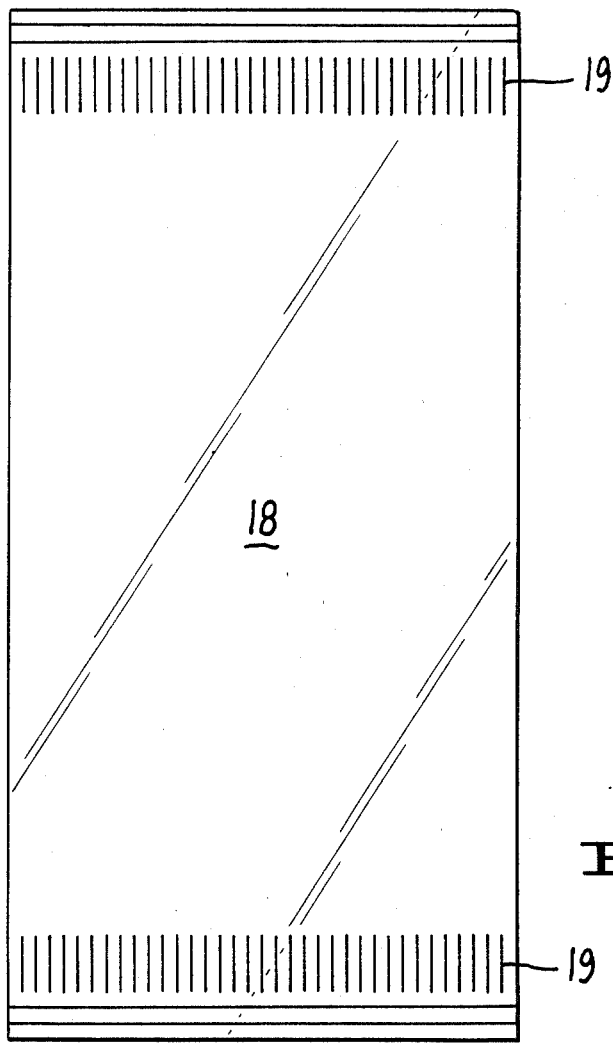
FIG. 5 is a front view of a heatsealed package made with the die shown in FIG. 4.

At least one of the lands 11 is truncated, and the depth of the groove 13 for receiving the land is greater than the height of the land. The truncated land is preferably adjacent to the knife slot 14. In preferred embodiments, such a truncated land and groove combination is adjacent to each side of the knife slot 13, as shown in FIGS. 2, 3 and 4.

Since the lands 11 are truncated, the area of contact between the lands 11 and grooves 13 is less than it would be if the lands were not truncated. Therefore the pressure applied to the heatsealable material by the lands 11 and grooves 13 is greater when the same force is applied by the die. The optimum amount of truncation of the lands 11 for a particular heatsealable material can be determined by routine experimentation.

Because the depth of the groove is greater than the height of the land, the top of the land does not contact the bottom of the groove. As a result, the force applied by the land and groove to the material being heatsealed is applied entirely as a shearing force. Because all the force is applied as a shearing force, and because the force is applied at a higher pressure, this land and groove configuration produces a better airtight seal than other configurations. Except for their height and depth, the land and groove substantially conform to each other. The angle of slope of the walls of the land and groove is preferably between about 45 and 90 degrees, and most preferably is about 60 degrees, as shown in FIG. 2.

Although the land and groove configuration of this invention produces a superior airtight seal, the strength of the seal (measured by the force required to rupture the seal to open the package) is less than that of certain other seals. This may be desirable in order to produce an easy-open seal, but if a stronger seal is desired, it may be formed by other land and groove configurations more remote from the knife slot 13 than the novel land and groove configuration of this invention. As shown in FIG. 3, the other land and groove configurations can be substantially conforming longitudinal lands 15 and grooves 16 wherein the profile of each land is a triangle wherein the angle of the apex of the triangle is greater than the angles of slope of the lands 11 and grooves 13 forming the superior airtight seal. In preferred embodiments, the angle of the apex of each land is equal to or greater than the angle of the apex of each land which is closer to the slot 13. The angle of slope of the other lands and grooves is preferably between about 90 and 120 degrees. Horizontal lands 15 and grooves 16 having an angle of slope of between about 90 and 120 degrees form stronger seals, and are less likely to fracture films, especially films containing a layer of metal foil, than lands and grooves having more acute angles of slope. The horizontal lands and grooves also form better airtight seals than corresponding vertical lands and grooves. When the airtightness of the seals formed by the horizontal lands and grooves is adequate, the lands and grooves may be the sole means to effect the seal. In preferred embodiments, the angle of the apex of the land most remote from the knife slot is greater than the angle of the apex of the land which is adjacent to the slot.

As shown in FIG. 4, vertical lands 17 can also be used in combination with the novel land and groove configuration of this invention. The heatsealed package 18 produced using the die shown in FIG. 4 has vertical serrations 19 which add stiffness and strength to the top and bottom heatseals of the package 18.

In preferred embodiments the lands 11 and grooves 13 adjacent the slot 14 reach complete contact (bottom out) before the other lands and grooves reach complete contact. This feature, which is shown in FIGS. 2, 3 and 4, assures that maximum pressure is applied to the heatsealable material between the lands 11 and grooves 13 adjacent the slot 14 to effect a good airtight seal.

Except for the novel die faces, the heatseal die of this invention is conventional and is adapted to be employed in conventional packaging machines, such as vertical form-and-fill machines. In such machines a roll of thermoplastic film is formed into a tube and passed between the opposed die faces of a heated heatseal die, which forms the top heatsealed edge of one package and the bottom heatsealed edge of another package. A knife housed in the slot 14 separates the two packages by severing the film just after the heatseals are formed.

Ten packages were made using the die of FIGS. 1 and 2 from coextruded film having a heatseal layer comprising a blend of polybutylene and a copolymer of ethylene and vinyl acetate. The film had an overall thickness of 2.2 mils. The packages, which contained air at a pressure of 0.5 psig, were tested for leaks by immersing them in water for one minute. None of the packages was found to leak. Similar results were obtained using films having other heatseal layers. In contrast, a substantial proportion, up to 72 percent, of packages made from the same films using other heatseal dies were found to leak.

I claim:

1. In a heatseal die for forming a heatseal between two heatsealable surfaces, the die having two die faces, one die face having a longitudinal land and the other die face having a groove for receiving the land, the land and the groove having substantially conforming sloping side walls, and the land being truncated, the improvement wherein the depth of the groove is greater than the height of the land, whereby the top of the land does not contact the bottom of the groove, and substantially all of the force applied by the land and the groove to the heatsealable surfaces is applied as a shearing force.

2. The improvement of claim 1 wherein the angle of the slope of the sloping side walls is between about 45 degrees and 90 degrees.

3. The improvement of claim 1 wherein the die includes a slot for receiving a knife and the land and groove are adjacent to the slot.

4. The improvement of claim 1 wherein the die includes a slot for receiving a knife and wherein a land and groove as described in claim 1 are adjacent to each side of the slot.

5. The improvement of claim 4 wherein the die includes other lands and grooves more remote from the slot than the lands and grooves adjacent to the slot, the other lands and grooves being substantially conforming longitudinal lands and grooves.

6. The improvement of claim 5 wherein the lands and grooves adjacent the slot reach complete contact before the other lands and grooves reach complete contact.

7. The improvement of claim 5 wherein the other lands and grooves have greater angles of slope than the lands and grooves adjacent to the slot.

8. The improvement of claim 7 wherein the angle of slope of the other lands and grooves is between about 90 and 120 degrees.

9. In a method of forming a heatseal between two heatsealable surfaces by pressing the surfaces together between two opposed heated die faces, one die face having a longitudinal land and the other die face having a groove for receiving the land, the land and the groove having substantially conforming sloping side walls, and the land being truncated, the improvement wherein the depth of the groove is greater than the height of the land, whereby substantially all of the force applied by the land and the groove to the heatsealable surfaces is applied as a shearing force.

* * * * *